(12) United States Patent
Yoshimura

(10) Patent No.: US 7,769,761 B2
(45) Date of Patent: Aug. 3, 2010

(54) INFORMATION PROCESSING APPARATUS, METHOD, AND PROGRAM PRODUCT

(75) Inventor: Shunji Yoshimura, Tokyo (JP)

(73) Assignee: Sony Corporation, Tokyo (JP)

( * ) Notice: Subject to any disclaimer, the term of this patent is extended or adjusted under 35 U.S.C. 154(b) by 259 days.

(21) Appl. No.: 11/671,370

(22) Filed: Feb. 5, 2007

(65) Prior Publication Data
US 2007/0198508 A1      Aug. 23, 2007

(30) Foreign Application Priority Data
Feb. 8, 2006   (JP) .............................. 2006-030482

(51) Int. Cl.
G06F 7/00      (2006.01)
G06F 17/00    (2006.01)
(52) U.S. Cl. ...................... 707/738; 707/914
(58) Field of Classification Search ................. 707/738, 707/914, 999, 737, 913
See application file for complete search history.

(56) References Cited

U.S. PATENT DOCUMENTS

| | | | |
|---|---|---|---|
| 6,070,133 A * | 5/2000 | Brewster et al. ............... | 704/9 |
| 6,104,989 A * | 8/2000 | Kanevsky et al. .............. | 704/9 |
| 6,363,380 B1 * | 3/2002 | Dimitrova ...................... | 707/6 |
| 6,493,663 B1 * | 12/2002 | Ueda ............................. | 704/9 |
| 2005/0096916 A1 * | 5/2005 | Sato et al. .................... | 704/278 |
| 2005/0096954 A1 * | 5/2005 | Halligan et al. ................ | 705/7 |
| 2005/0144013 A1 * | 6/2005 | Fujimoto et al. ............. | 704/277 |
| 2005/0278189 A1 * | 12/2005 | Mercadante et al. .......... | 705/1 |
| 2006/0080311 A1 * | 4/2006 | Potok et al. .................... | 707/5 |
| 2006/0122849 A1 * | 6/2006 | Masuyama et al. ............ | 705/1 |

FOREIGN PATENT DOCUMENTS

JP      11-234611      8/1999

OTHER PUBLICATIONS

Multi-Paragraph Segmentation Expository Text, 32$^{nd}$. Annual Meeting of the Association for Computational linguistics (1994).

* cited by examiner

Primary Examiner—John R. Cottingham
Assistant Examiner—Nicholas E Allen
(74) Attorney, Agent, or Firm—Oblon, Spivak, McClelland, Maier & Neustadt, L.L.P.

(57) ABSTRACT

An information processing apparatus includes an extraction unit configured to extract sequentially in time, keywords from multiple character strings, and a similarity calculation unit configured to calculate similarity values of the extracted keywords included in adjacent first regions of the multiple character strings, each first region including a predefined part of the multiple character strings.

17 Claims, 10 Drawing Sheets

INFORMATION PROCESSING APPARATUS, METHOD, AND PROGRAM PRODUCT

CROSS REFERENCE TO RELATED APPLICATIONS

The present disclosure contains subject matter related to Japanese Patent Application JP 2006-030482, filed in the Japanese Patent Office on Feb. 8, 2006, the entire contents of which is incorporated herein by reference.

BACKGROUND OF THE INVENTION

1. Field of the Invention

The present invention relates to an information processing apparatus, a method, and a program product that calculate similarities of keywords as criteria for detecting positions of changing topics in contents.

2. Description of the Related Art

In related arts, various techniques for detecting a change between topics (i.e., changing points of the topics) in contents such as television programs have been proposed. At the positions of the changing points of the topics in the content, information indicating the changing points is added to be used, for example, as chapter indicators/descriptors when the content is reproduced.

In JP-A-11-234611, a technique is disclosed, in which a list of topic-changing words is previously stored in the device, and when a word from the head of the caption information is the same word as the topic-changing word stored in the list, a displaying position in the caption information is detected as a changing position of topics.

SUMMARY OF THE INVENTION

The invention has been made in view of the above situation, and similarities of keywords are calculated as one criteria for detecting positions of changing points of topics in contents.

An information processing apparatus according to an embodiment of the present invention includes an extraction unit configured to extract sequentially in time, keywords from multiple character strings, and a similarity calculation unit configured to calculate similarity values of the extracted keywords included in adjacent first regions of the multiple character strings, each first region including a predefined part of the multiple character strings.

An information processing method and a program-product according to other embodiments of the present invention includes extracting sequentially in time, keywords from multiple character strings, and calculating similarity values of keywords included in adjacent regions of the multiple character strings, each region including a predefined part of the multiple character string.

DESCRIPTION OF THE PREFERRED EMBODIMENTS

Embodiments of the invention will be described below, and the correspondence between constituent features of the invention and embodiments described in the specification and the drawings is exemplified as follows. If there is an embodiment disclosed in the specification and the drawings but not identified as the embodiment corresponding to a constituent feature of the invention, that does not mean that the embodiment does not correspond to the constituent feature. Conversely, if an embodiment is disclosed as the embodiment corresponding to a constituent feature, that does not mean that the embodiment does not correspond to other than the constituent feature.

When the technique disclosed in JP-A-11-234611 is used, it is necessary that the list of the topic-changing words be previously prepared and stored. When the topic-changing word is not in the head of the caption information displayed, although it corresponds to the position where the topic is changed when the technique disclosed in JP-A-11-234611, it is difficult to detect the changing position of the topics. As a result, a reliability of the detection in the conventional devices is reduced.

An information processing apparatus (for example, an information processing apparatus 1 of FIG. 1) according to an embodiment of the invention includes an extraction unit (for example, a keyword extraction unit 32 of FIG. 5) for extracting keywords, sequentially in time, (also called in the specification, time series of keywords) from character strings corresponding to displayed pictures. The character strings may be displayed or spoken by a person. In addition, the information processing apparatus includes a calculation unit (a similarity calculation unit 34 in FIG. 5) for calculating similarities of keywords included in adjacent regions of the character strings. As will be discussed next, the adjacent regions are defined on a time basis for example, or as having prescribed ranges relative to the character strings.

The information processing apparatus may further include a detection unit (for example, a changing point detection unit 35) for detecting a boundary point between the adjacent regions (prescribed ranges). The detecting is determined based on a similarity value (called similarity) of keywords included in the prescribed ranges. When a similarity value is lower than a threshold similarity value, based on the similarities calculated by the similarity calculation unit, the changing point (changing topic) is determined. As will be appreciated by one of ordinary skill in the art, the threshold similarity value depends on the method selected for calculating the similarity value, as discussed next.

The information processing apparatus further includes a detection unit (for example, an attribute information generation unit 112) for detecting a part of a content in which a similarity calculated by the similarity calculation unit is higher than a prescribed similarity value. This detected part is indicative of a vigorous (highly entertaining/desired) part of a subject of the content as will be discussed later.

An information processing method and a program-product according to an embodiment of the invention includes steps of extracting time series of keywords from the character strings, which correspond to the displayed pictures, and calculating (for example, step S4 of FIG. 6) similarities of the keywords included in the prescribed ranges adjacent to each other on a time base.

Hereinafter, embodiments of the invention will be explained with reference to the drawings.

Figure 1:
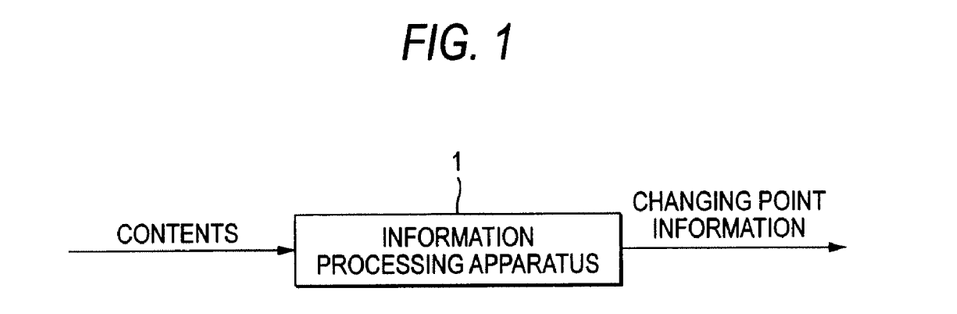
FIG. 1 is a block diagram showing an information processing apparatus according to an embodiment of the invention.

FIG. 1 is a block diagram showing an information processing apparatus according to an embodiment of the invention.

An information processing apparatus 1 is the apparatus in which contents, such as television programs and movies, are taken as input, changing points of topics (subjects) are detected, and changing points information as information indicating the detected changing points is outputted as an output. The information processing apparatus 1 is described later in more details.

Contents to be inputted to the information processing apparatus 1 include not only video data and audio data but also text data (multiple character strings) such as closed caption data used for displaying captions corresponding to the displayed pictures on a screen when the content is reproduced, and the changing points of the topics are detected by using the text data in the information processing apparatus 1.

As described later, the changing points information outputted from the information processing apparatus 1 is used for adding attribute information to the contents. For example, time information indicating positions of the detected changing points (information of chapters) and the like are generated as attribute information to be added to contents.

Figure 2:
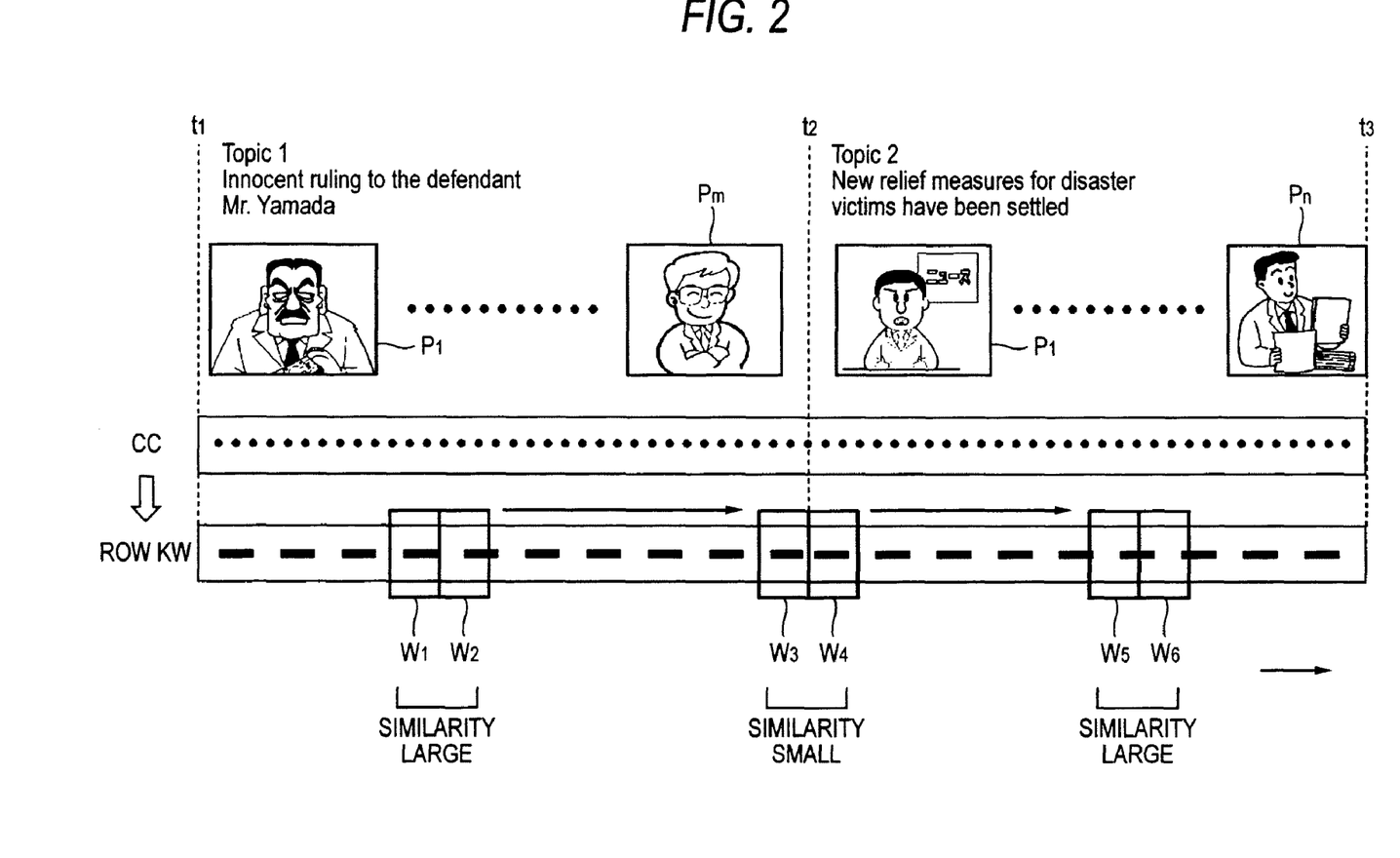
FIG. 2 is a view showing an example of detection of a changing point of topics.

FIG. 2 shows an example of detection of a changing point of two topics. A case where a content to be processed is a news program is explained.

In the example of FIG. 2, when the news program is played, news about "innocent ruling to the defendant Mr. Yamada" is reproduced as topic 1 from a time "$t_1$," and news about "new relief measures for disaster victims have been settled" is reproduced as topic 2 from a time "$t_2$". Therefore, a changing point between topics 1 and 2 of the news corresponds to time "$t_2$."

The content includes closed caption data ("CC" in the drawing) (text data). When the news about the topic 1, which is started from the time "$t_1$" is reproduced, for example, captions of the same subject as the subject spoken by a caster about the topic 1 are sequentially displayed on a reproducing screen, so as to correspond to displayed pictures "$P_1$" to "$P_m$," which represent a subject of the topic 1. The captions are based on text data in a range from the time "$t_1$" to "$t_2$" in FIG. 2.

When the news about the topic 2, which is started from the time "$t_2$" is reproduced, for example, captions of the same subject as the subject spoken by a caster about the topic 2 are sequentially displayed on the reproducing screen, so that the captions correspond to displayed pictures "$P_1$" to "$P_n$," which represent a subject of the topic 2. The captions are based on text data in a range from the time "$t_2$" to "$t_3$" in FIG. 2.

In the case that the content to be processed is similar to the one described above, time-series of keywords ("KW series" in the drawing) are extracted from the text data as shown by a tip of an outline arrow in FIG. 2 in the information processing apparatus 1.

More specifically, at the start of the news about the topic 1, when the caption "First, this is news about innocent ruling to the defendant Mr. Yamada." is displayed based on the text data, time series of keywords "news," "innocent," "ruling," "defendant," "Yamada" and so on are extracted from the text data. Similarly, at the start of the news about topic 2, when the caption "Next, this is news that new relief measures for disaster victims have been settled." is displayed based on text data, time series of keywords "news," "relief measures," "disaster," "victims," and the like are extracted from the text data.

When the time series of keywords are extracted, detection windows respectively surrounding prescribed ranges of keywords, which are adjacent to each other on a time base, are set in the information processing apparatus 1. For example, when one detection window surrounds a range of 10 keywords, if the whole time series of keywords includes 1 to "N" keywords, a detection window "A," which surrounds keywords 1 to 10 and a detection window "a," which is the detection window surrounding keywords 11 to 20 are set. The detection window "a" is adjacent to the detection window "A" on the time base.

Similarly, a detection window "B," which surrounds keywords 2 to 11, and a detection window "b," which is the detection window surrounding keywords 12 to 21, are set adjacent to each other on the time base. A detection window "C," which surrounds keywords 3 to 12, and a detection window "c," which is the detection window surrounding keywords 13 to 22, are set adjacent to each other on the time base. That is, the detection windows surrounding keywords of prescribed ranges are set at adjacent positions by shifting continuously or not a keyword number by one. Optionally, the keyboard number may be shifted with a value larger than 1.

In the information processing apparatus 1, when the detection windows are set, a similarity value of all keywords included in a first detection window is calculated by comparing with an adjacent second detection window on the time base. As described later, the similarity value may be detected based on the number of corresponding keywords included in first and second detection windows. Various techniques for calculating the similarity value of two detection windows are discussed below.

In the information processing apparatus 1, the changing point of two consecutive topics is detected based on the calculated similarities values as discussed above. For example, a boundary point (changing point of topics) between adjacent detection windows is determined when the calculated similarity value is lower than a preset threshold similarity value.

In the example shown in FIG. 2, a similarity between keywords included in a detection window "$W_1$" and keywords included in a detection window "$W_2$," which are set at adjacent positions on the time base is high, whereas a similarity between keywords included in a detection window "$W_3$" and keywords included in a detection window "$W_4$" is low. In addition, a similarity between keywords included in a detection window "$W_5$" and keywords included in a detection window "$W_6$" is high. The terms "high" and "low" are defined in an exemplary manner below.

Figure 3:
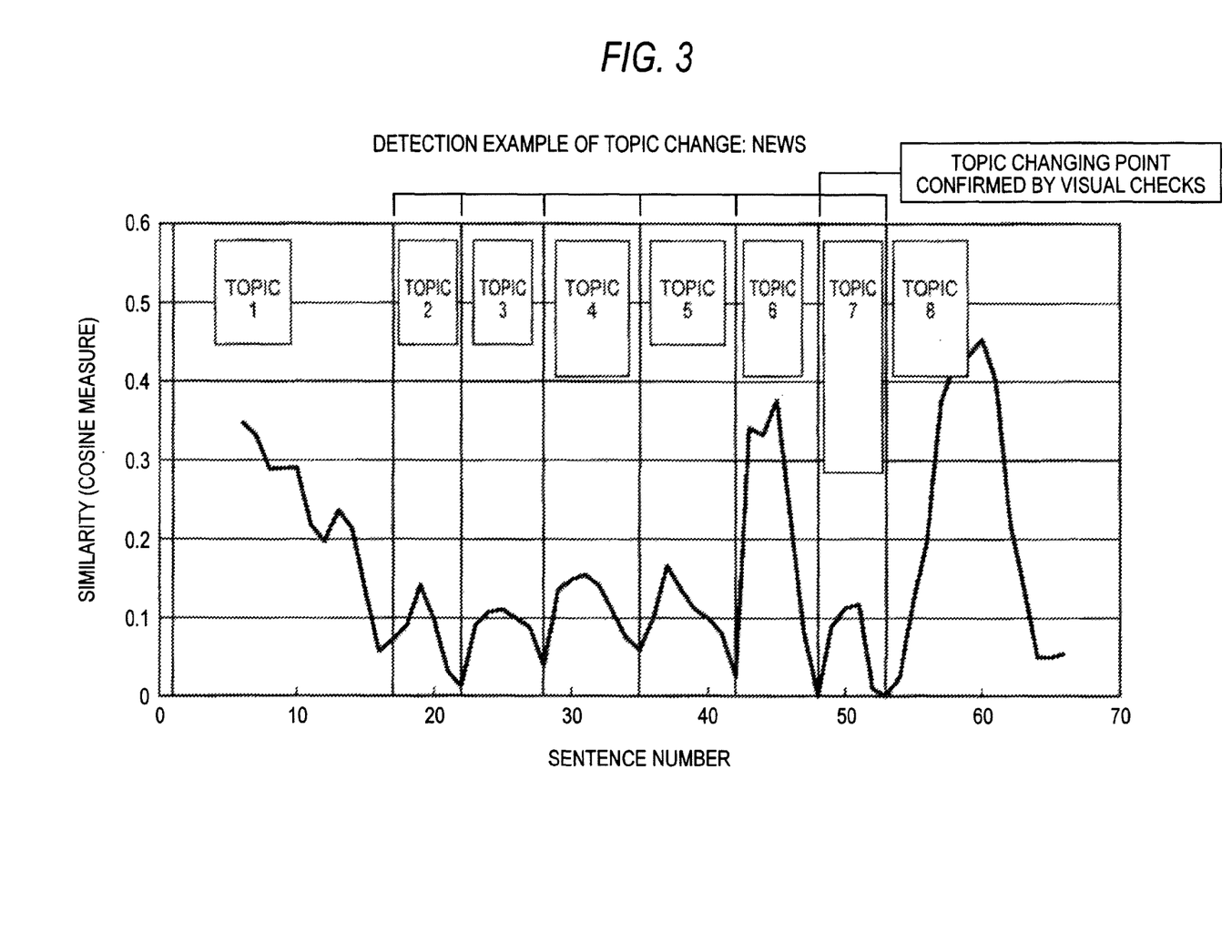
FIG. 3 is a graph showing changing points of topics confirmed by a human and calculation results of similarities.

For example, in one embodiment as shown in FIG. 3, eight distinct topics are present. A border between two adjacent topics (turning point) is defined by a minimum value of a cosine measure of the detected keywords in two adjacent detection windows. In addition, the calculated minimum value may be required to be smaller than a predetermined threshold value, for example 0.1 in FIG. 3. Thus, a minimum value that corresponds to sentence number 10 in FIG. 3 is eliminated as a turning point. Further, the minimum value may be required to be smaller than a product between a depth and a positive coefficient k. The depth is defined as a gap between (1) an average of two maximum values adjacent to a given minimum value, and (2) the given minimum value. The coefficient k may be 1.0.

In one embodiment, the changing point is determined by calculating each minimum value, verifying that the calculated minimum value is below a threshold value (for example 0.1), and also verifying that the minimum value is smaller than the depth multiplied by a coefficient k (for example 1.0).

In other words, when a detected minimum value satisfies one or more of the above noted conditions, a similarity value of two detection windows is considered low. When no minimum value is detected between two detection windows, the similarity value of the two detection windows is considered high.

When the set detection windows are both windows surrounding keywords extracted from text data concerning the same topic, the original topic is common to respective windows. Therefore, similar keywords are included in respective detection windows and, in this case, the similarity of the keywords included in the detection windows set at the adjacent positions on the time base is high.

In the example shown in FIG. 2, the detection window "$W_1$" and the detection window "$W_2$" are both windows surrounding keywords extracted from the text data concerning the topic 1. Similarly, the detection window "$W_5$" and the detection window "$W_6$" are both windows surrounding keywords extracted from the text data concerning the topic 2.

On the other hand, when the set detection windows are both windows surrounding keywords extracted from text data concerning different topics, that is, when the detection window set at a previous position on the time base is the window surrounding the keywords extracted from the text data concerning the first topic, and the detection window set at a position next to the above detection window on the time base is the window surrounding the keywords extracted from the text data concerning the second topic, the original topics are different. Therefore, different keywords are included in the respective detection windows and, in this case, the similarity of the keywords included in the detection windows set at the adjacent positions on the time base is low.

In the example shown in FIG. 2, the detection window $W_3$ is the window surrounding the keywords extracted from the text data concerning the topic 1, and the detection window $W_4$ is the window surrounding the keywords extracted from the text data concerning the topic 2. That is, the detection window $W_3$ and the detection window $W_4$ are windows surrounding keywords extracted from text data concerning different topics.

Accordingly, in the information processing apparatus 1, similarities of respective parts in the content are calculated by using the text data which is considered to reflect topics of the content. In addition, the changing point of topics in the content is detected based on the calculated similarities.

Accordingly, the changing point of topics can be detected based on the text data in a more reliable manner as compared with a case in which the changing point of topics is detected by analyzing pictures displayed on the screen when the content is reproduced.

FIG. 3 is a graph showing changing points of topics visually checked by a human and the calculated results of similarities found according to the above method for confirming the effect of a method according to one embodiment of the invention.

In the example shown in FIG. 3, a horizontal axis represents sentence numbers (the text data displayed as captions is delimited according to sentences and the sentences are sequentially numbered), and a vertical axis represents similarities (in this embodiment, the cosine measure based on the later-described vector space model is used). Values on the vertical direction shown in FIG. 3 represent the cosine measure of keywords included in the detection windows set at adjacent positions on the time base. The higher the value of the cosine measure is, the higher the similarity value is.

As shown in FIG. 3, the positions for which the similarities of the keywords extracted from the captions are low and below a threshold value (for this embodiment) and the positions of the changing points of topics confirmed by visual checks are almost coincident, which shows that the method of this embodiment is efficient and reliable. The processing of the information processing apparatus 1 is described later with reference to a flowchart.

Figure 4:
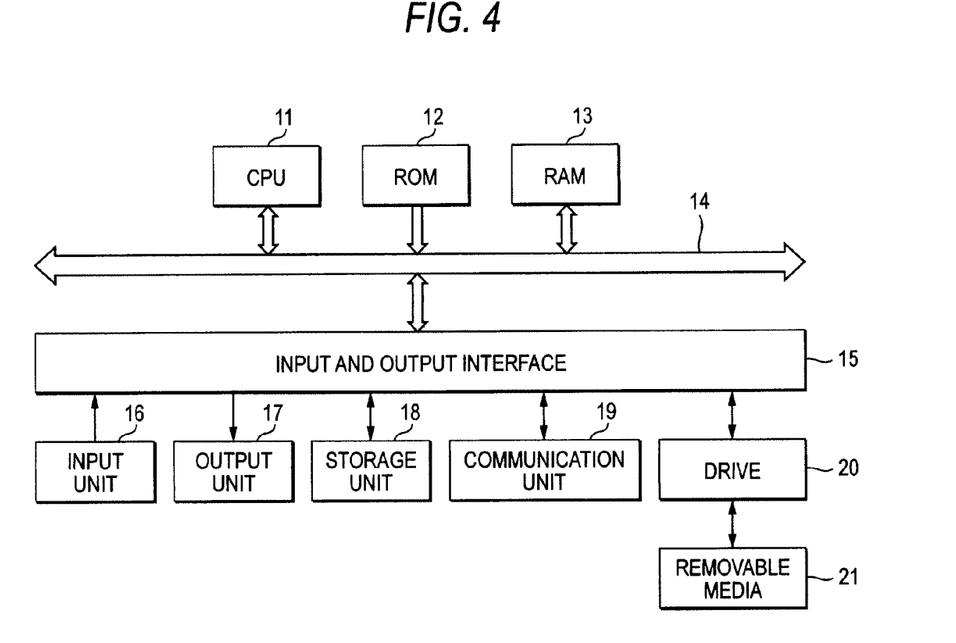
FIG. 4 is a block diagram showing a hardware configuration example of the information processing apparatus.

FIG. 4 is a block diagram showing a hardware configuration example of the information processing apparatus 1 of FIG. 1. The hardware configuration shown in FIG. 4 may be part of a microprocessor, chip, computer, personal digital assistant, a mobile communication device, etc., as will be appreciated by one of ordinary skill in the art. However, other possible implementations of the information processing apparatus are possible, for example, a specialized circuitry or software capable of running on a microprocessor.

A CPU (Central Processing Unit) 11 executes various processing in accordance with programs stored in a ROM (Read Only Memory) 12 or a storage unit 18. Programs executed by the CPU 11, data and so on are suitably stored in a RAM (Random Access Memory) 13. The CPU 11, the ROM 12, and the RAM 13 are mutually connected by a bus 14.

An input and output interface 15 is also connected to the CPU 11 through the bus 14. An input unit 16 receiving input of contents and an output unit 17 outputting changing point information are connected to the input and output interface 15.

The storage unit 18 connected to the input and output interface 15 includes, for example, a hard disc, which stores programs executed by the CPU 11 and various data. A communication unit 19 communicates with external apparatuses through networks such as Internet or local area networks.

A drive 20 connected to the input and output interface 15 drives removable media 21 such as a magnetic disc, an optical disc, an electro-optical disc or a semiconductor memory, when they are mounted on, and acquires programs and data stored therein. The acquired program and data are forwarded to the storage unit 18 and stored therein, if necessary.

Figure 5:
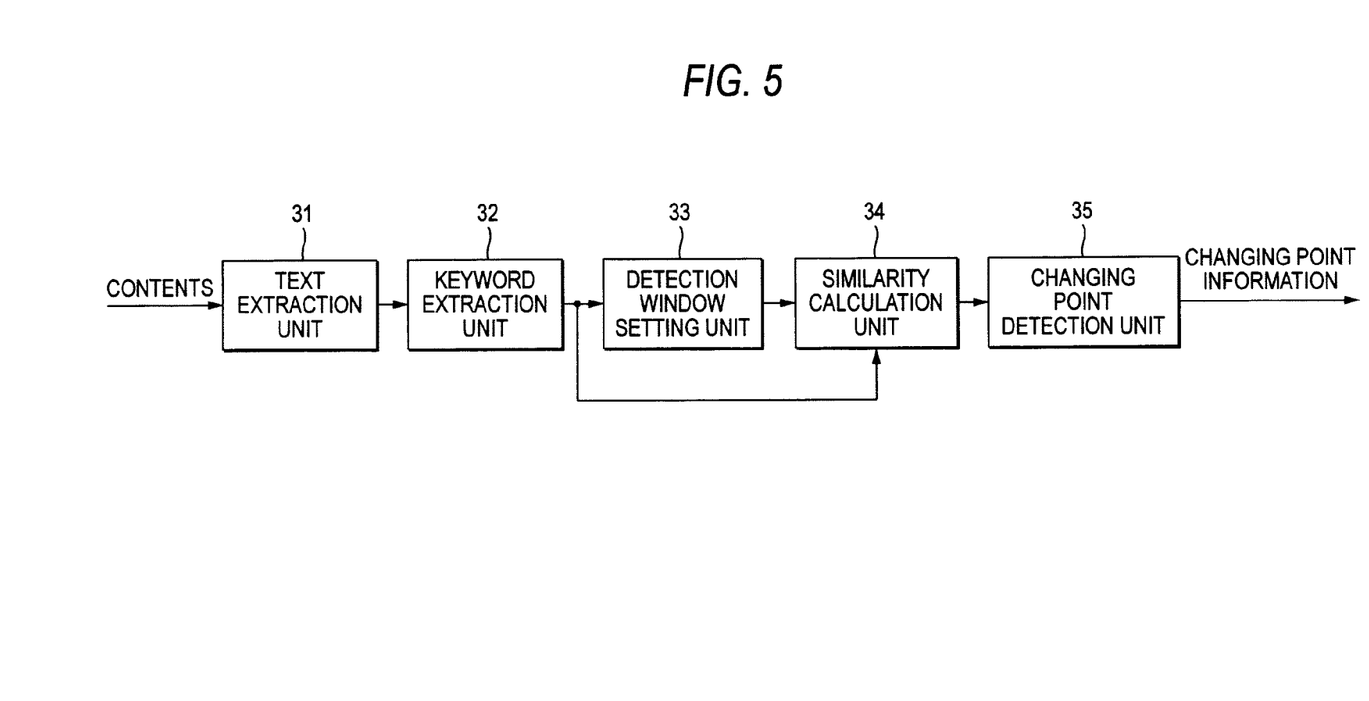
FIG. 5 is a block diagram showing a function configuration example of the information processing apparatus.

FIG. 5 is a block diagram showing a function configuration example of the information processing apparatus 1. At least a part of function units shown in FIG. 5 is realized by a designated computer executable program being executed by the CPU 11 of FIG. 4.

In the information processing apparatus 1, for example, a text extraction unit 31, a keyword extraction unit 32, a detection window setting unit 33, a similarity calculation unit 34 and a changing point detection unit 35 are provided.

The text extraction unit 31 extracts text data (character strings displayed as captions) from the supplied contents, and outputs the extracted text data to the keyword extraction unit 32.

The keyword extraction unit 32 performs, for example, morphological analysis with respect to text data supplied from the text extraction unit 31, extracting morphemes of only a particular part of speech such as nouns or verbs based on results of the morphological analysis. The morphological analysis may include dividing each sentence in corresponding words and associating each word with a word class. This analysis may be further modified to discard predefined word classes. For example, in one embodiment, only the noun and verb classes are considered and all other parts of the sentence are not considered.

The keyword extraction unit 32 regards the extracted string of morphemes as the string of keywords (time series), outputting the time series of keywords to the detection window setting unit 33 and the similarity calculation unit 34.

The detection window setting unit 33 sets the detection windows (adjacent regions) surrounding keywords of prescribed ranges which are adjacent on the time base, by shifting a keyword one by one, and outputs information of the set detection windows (information about the range of respective detection windows and the like) to the similarity calculation unit 34.

The detection window may be set according to the prescribed number so as to surround ten keywords as described above but also set according to a prescribed number of sentences. For example, the detection window may be set to surround keywords extracted from one sentence displayed as a caption. Further, the detection window may be set according to a predefined time interval to surround keywords extracted from sentences displayed for a period of a prescribed time (ten seconds for example) as a caption when the content is reproduced.

A user may select how to set the detection windows, or the user may select a granularity of the detection windows (in the above example, the detection window may be set so as to surround 20 keywords or the detection window may be set so as to surround 50 keywords or any desired number of keywords). In addition, a suitable type and granularity for the detection windows may be found in advance according to categories of programs to be shown as options, or the detection windows are automatically set based on category information of the EPG (Electronic Program Guide) and the like. Further, fineness in changes of the similarities to be detected may be changed by changing the granularity of the detection windows. Therefore, according to an embodiment of the invention, the granularity is changed to a suitable setting in the case of a later-described detection of a concentration degree of a topic.

The similarity calculation unit 34 calculates the similarities of keywords included in the detection windows set in the time series. The keywords are supplied from the keyword extraction unit 32, based on information supplied from the detection window setting unit 33. The similarity calculation unit 34 outputs information of the calculated similarities to the changing point detection unit 35.

In the similarity calculation unit 34, the similarities are calculated not only based on the number of similar keywords as described above but also based on, for example, the vector space model or similar models. That is, the keywords included in respective detection windows set at adjacent positions on the time base are arranged on a high dimension vector space. The frequency of appearance of respective unique keywords is represented in the vector space for two adjacent detection windows to obtain one or more vectors for each window. The vector difference between a vector corresponding to a first window and a vector corresponding to a second window may define the similarity value of the two windows.

Alternatively, other correlations between the vectors indicating the keywords included in one detection window and the vectors indicating the keywords included in the other detection window are calculated by using a scalar product, the cosine measure, an Euclidian distance and the like, and the results indicate the similarities of the topics of the two detection windows.

The calculation methods of similarities are not limited to the above examples. According to an embodiment of the present invention, weighting is appropriately performed according to parts of speech (word class) of keywords. For example, various weights may be assigned to various parts of speech and the similarity value of the topics of the detecting windows are calculated based on these weights.

The changing point detection unit 35 detects a boundary point between the detection windows as a changing point of topics in the content. When a lower similarity value than a prescribed threshold similarity value is calculated, based on information supplied by the similarity calculation unit 34, the changing point detection unit 35 outputs changing point information indicating the position (time) of the detected changing point.

Processing of the information processing apparatus 1 which detects the changing points of topics as described above is explained with reference to a flowchart shown in FIG. 6.

In step S1, the text extraction unit 31 extracts text data from the supplied content, and outputs the extracted text data to the keyword extraction unit 32.

In step S2, the keyword extraction unit 32 performs the morphological analysis with respect to the text data supplied from the text extraction unit 31, and outputs the extracted time-series of keywords, based on the result of the morphological analysis, to the detection window setting unit 33 and the similarity calculation unit 34.

In step S3, the detection window setting unit 33 sets the detection windows surrounding keywords of prescribed ranges at adjacent positions on the time base by shifting a keyword one by one, in the case that keywords included in one detection window are determined based on the number of keywords. Further, step S3 outputs information of the set detection windows to the similarity calculation unit 34.

In the case that the keywords included in one detection window are determined based on the sentence method, the detection window setting unit 33 sets detection windows surrounding keywords extracted from respective sentences by shifting a sentence displayed as a caption one by one. Also, in the case that keywords included in one detection window are determined based on the time method, the detection window setting unit 33 sets detection windows surrounding keywords extracted from sentences displayed as captions at corresponding periods of time by shifting the time sequentially.

In step S4, the similarity calculation unit 34 calculates the similarities of the keywords included in the detection windows supplied from the keyword extraction unit 32 based on information supplied from the detection window setting unit 33, and outputs information of the calculated similarities to the changing point detection unit 35.

In step S5, the changing point detection unit 35 detects a boundary point between the detection windows as a changing point of the topics in the content. A lower similarity value than a prescribed threshold similarity value is calculated based on information supplied from the similarity calculation unit 34. The changing point detection unit 35 outputs the changing point information indicating the position of the detected changing point.

According to the above processing, the information processing apparatus 1 may calculate the similarities of respective parts of the content by using text data, which is considered to reflect the change of topics of the content. The information processing apparatus 1 may also detect changing points of topics based on the calculated similarities.

Next, a generation of attribute information based on the changing point information generated as described above is explained. The generated attribute information is added to the content and used on occasions such as, for example, a reproduction of the content.

Figure 7:
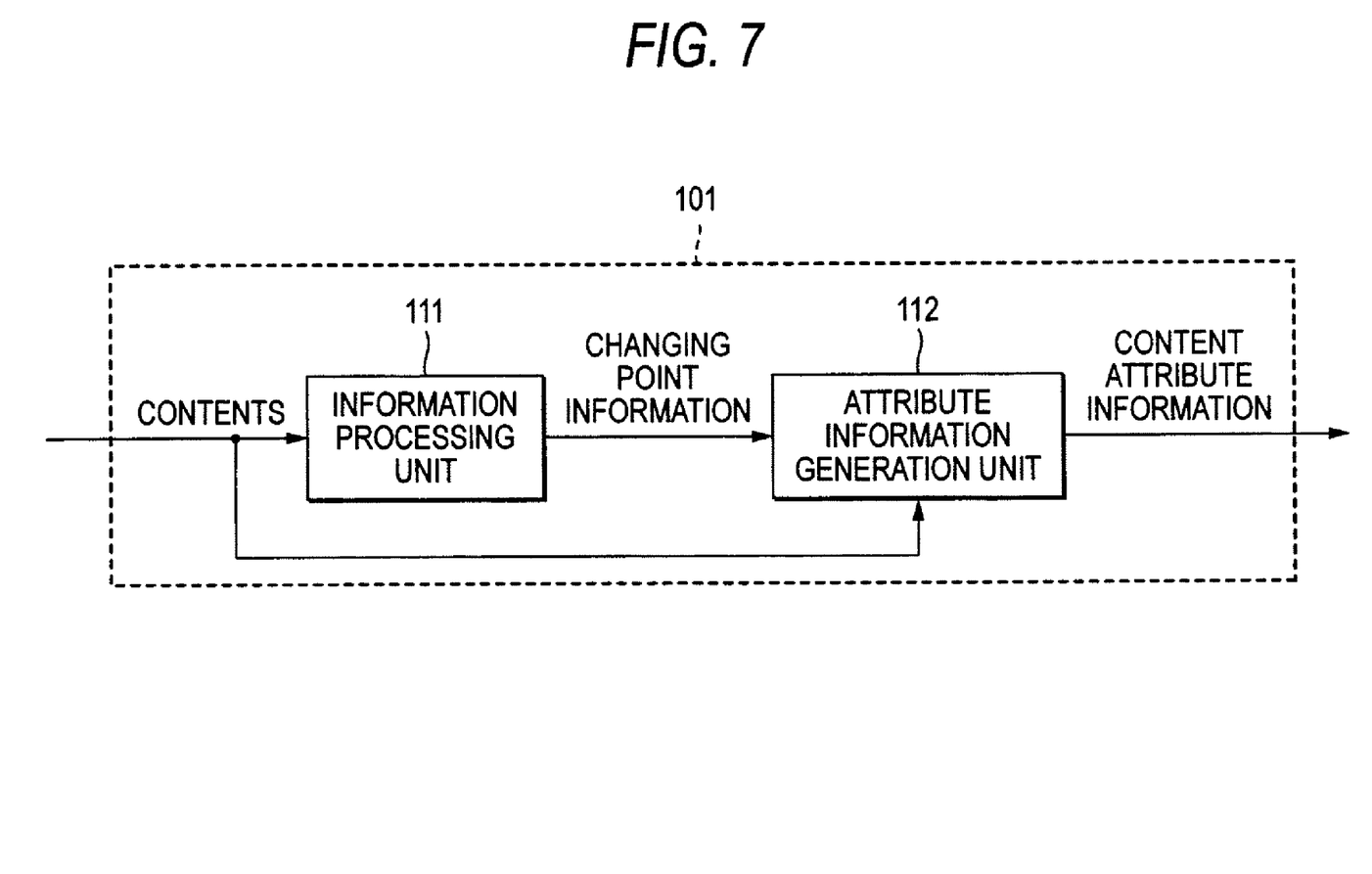
FIG. 7 is a block diagram showing a function configuration example of an information processing apparatus.

FIG. 7 is a block diagram showing a function configuration example of an information processing apparatus 101.

The information processing apparatus 101 may have the hardware configuration of FIG. 4, similar to the above disclosed information processing apparatus 1. An information processing unit 111 and an attribute information generation unit 112 may be provided in the information processing apparatus 101 as shown in FIG. 7 by a designated computer executable program being executed by the CPU 11 of the information processing apparatus 101.

The information processing unit 111 input contents such as television programs and movies as input, detects changing points of topics appeared when the content is reproduced, and outputs changing point information which is information indicating the detected changing points to the attribute information generation unit 112. That is, the information processing unit 111 may have the same configuration as the configuration shown in FIG. 5, detecting changing points in the manner described above.

The attribute information generation unit 112 generates attribute information based on the changing points information supplied from the information processing unit 111, and adds the generated attribute information to the content inputted from outside. The attribute information generation unit 112 sets, for example, title chapters at positions detected as the changing points of topics, and generates information indicating positions of the chapters as attribute information.

In addition, the attribute information generation unit 112 selects keywords representing respective topics from the keywords extracted by the information processing unit 111 based on text data displayed as captions in sections of respective topics, and generates information indicating the selected keywords (important words) as attribute information. For example, a keyword may be selected as an important word, which is most frequently included in the keywords extracted from the text data displayed as a caption at a section of each topic.

Figure 8:
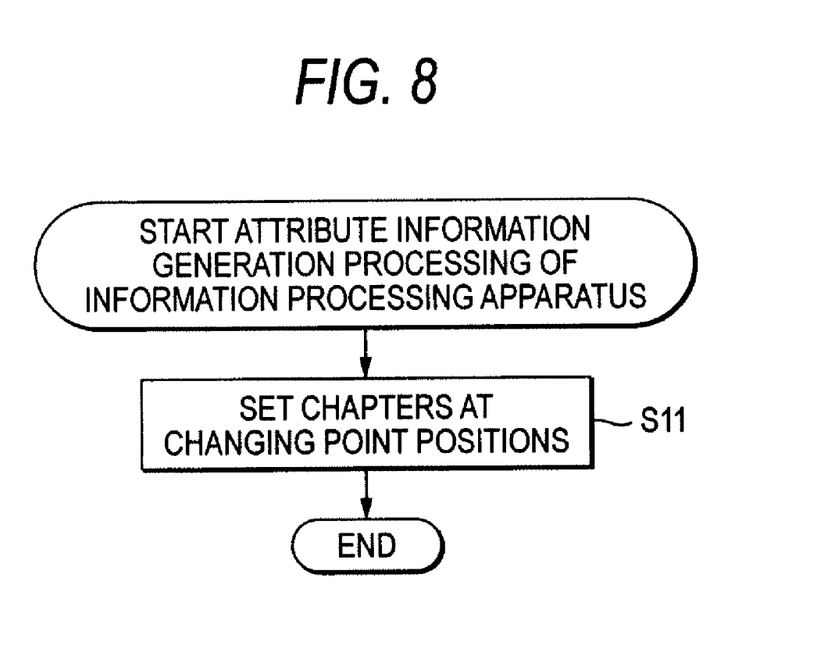
FIG. 8 is a flowchart explaining attribute information generation processing of the information processing apparatus of FIG. 7.

Attribute information generation processing of the information processing apparatus 101 (the attribute information generation unit 1 12) of FIG. 7 is explained with reference to a flowchart shown in FIG. 8. The processing may be started, for example, when the processing explained with reference to FIG. 6 is performed by the information processing unit 111 and the changing point information is supplied to the attribute information generation unit 112.

In step S11, the attribute information generation unit 1 12 sets indicators of chapters at positions detected as the changing points of the topics in the content based on the changing point information supplied from the information processing unit 111, and adds attribute information indicating positions of the chapters to the content to be outputted.

Accordingly, an apparatus capable of reproducing contents may automatically search reproducing positions based on the positions of the chapters indicated by the attribute information, or may display a window in which images of the positions where the chapters are set are thumbnail-displayed.

Figure 9:
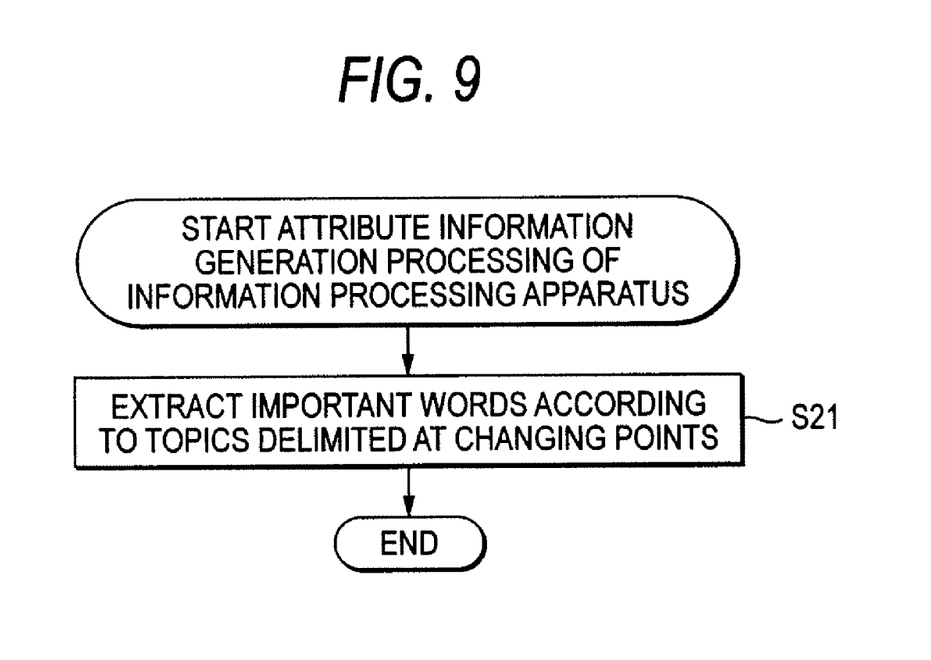
FIG. 9 is a flowchart explaining attribute information generation processing of the information processing apparatus of FIG. 7.

Next, a generation processing of other attribute information of the information processing apparatus 101 of FIG. 7 is explained with reference to a flowchart shown in FIG. 9.

Figure 6:
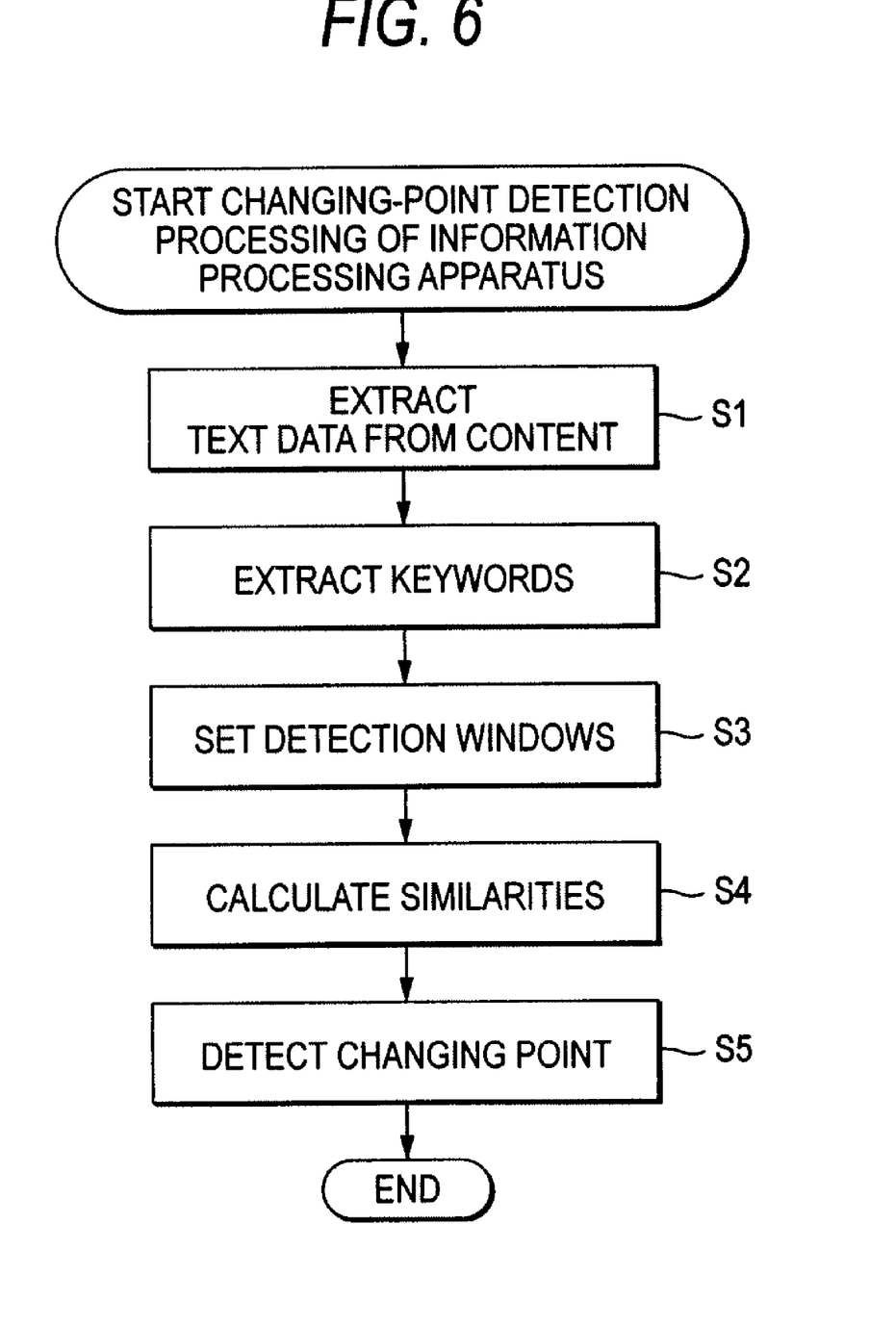
FIG. 6 is a flowchart explaining changing point detection processing of the information processing apparatus.

The processing may be also started, for example, when the processing explained with reference to FIG. 6 is performed by the information processing unit 111 and the changing point information is supplied to the attribute information generation unit 112. From the information processing unit 111, the time series of the keywords are also outputted to the attribute information generation unit 112.

In step S21, the attribute information generation unit 112 selects keywords representative of topics as important words in respective sections of topics delimited by the changing points, based on the changing point information supplied from the information processing unit 111. The attribute information generation unit 112 adds attribute information indicating important words to the content to be outputted.

The important words selected as described above may be set as titles of the detected respective sections, or used, for example, when only sections in which character strings including the important words are displayed as captions. According to an embodiment of the invention, the attribute information generation unit 112 may set the titles based on the important words or generate information indicating the summarized reproduced sections.

In the above embodiment, the similarities calculated based on keywords included in the detection windows may be used for detecting changing points of topics. However, the similarities may be used for other purposes.

A similarity indicates that character strings including similar keywords are sequentially displayed as captions. Therefore, a part of a content having the high similarity value is considered to be the part in which a topic is concentrated in a particular subject. Accordingly, the similarity value can be also used as being indicative of a concentration degree of a topic. In other words, with regard to FIG. 10, one topic is illustrated having two regions, one labeled "content of incident" and the other one labeled "interviews . . . ." The high similarity value of the first region comparative to the second region indicates that the first region of the topic has the high concentration degree of newsworthy information while the second region of the topic has secondary information.

Figure 11:
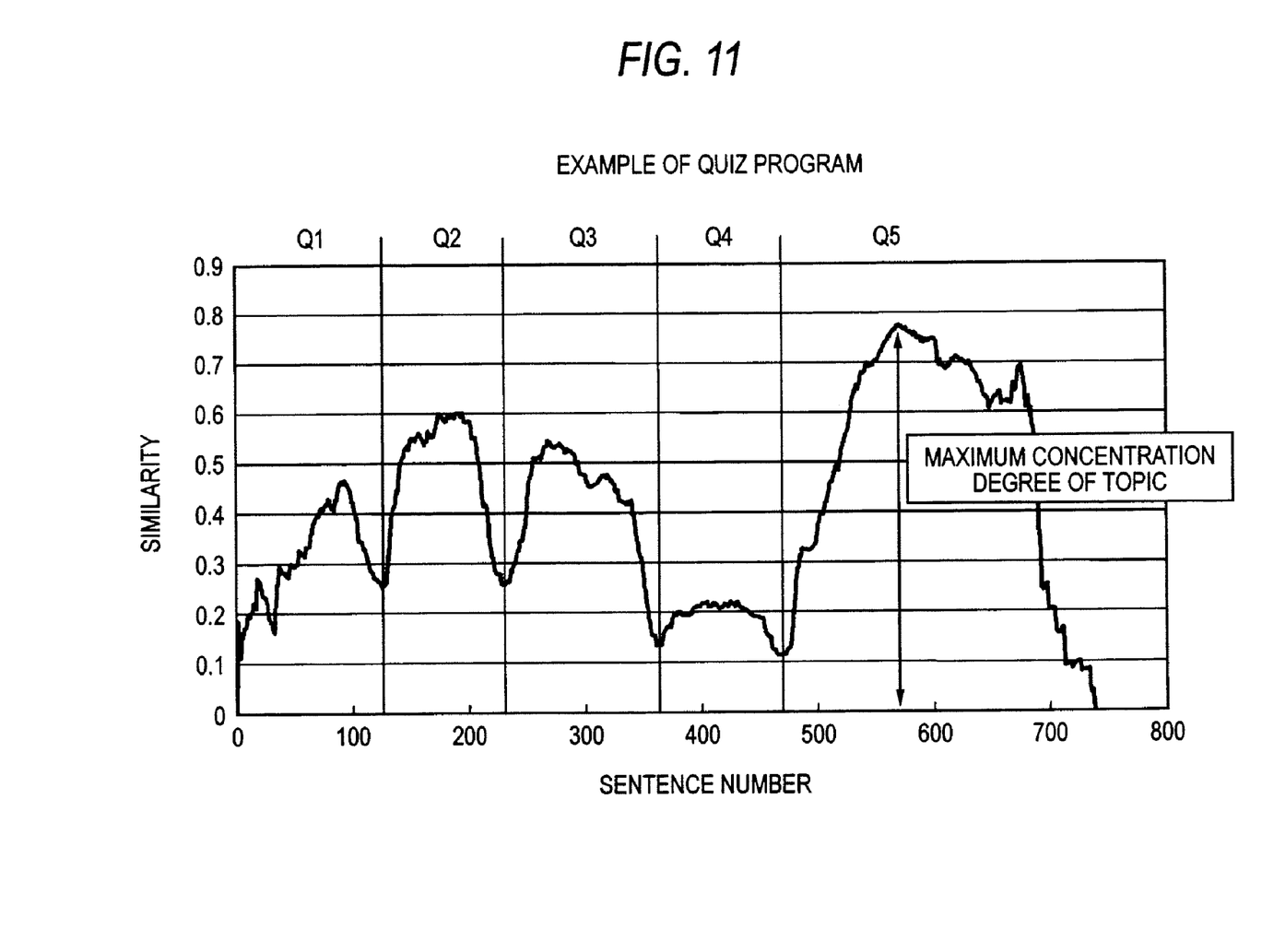
FIG. 11 is a graph showing another example of calculation results of similarities.

In another example, FIG. 11 shows one topic having multiple regions Q1-Q5 and region Q5 having the highest number of keywords, i.e., being the most attractive segment of the topic. The various regions (segments) within a topic may be detected by using the above discussed changing points method modified to determine the minimum value of the cosine measure that are above (not below) the threshold.

Thus, the minimum values that are below a predefined threshold in this embodiment are used to determine the changing points between topics, the minimum values above the predefined threshold are used to determined the changing points between segments with different concentration of keywords within the same topic, and the maximum values determine those segments of the topic that are the most attractive/newsworthy. Also, the most attractive/newsworthy segments may be determined by selecting the first "n" maximum values, with n being a positive integer number.

By using the concentration degree of the topic discussed above, for example, the concentration degrees of the topic in respective topics delimited by the detected changing points are compared, and a part/segment may be found in which the topic is most concentrated in content (or a program).Thus, a part/segment that includes a high concentration of keywords (part that is highly representative of the topic) of the content may be determined.

When a granularity of the detection windows is set as described above, a part in one topic in which the topic is particularly concentrated may be found from transitions of the concentration degrees of the topic within a topic section delimited by the detected changing points.

Figure 10:
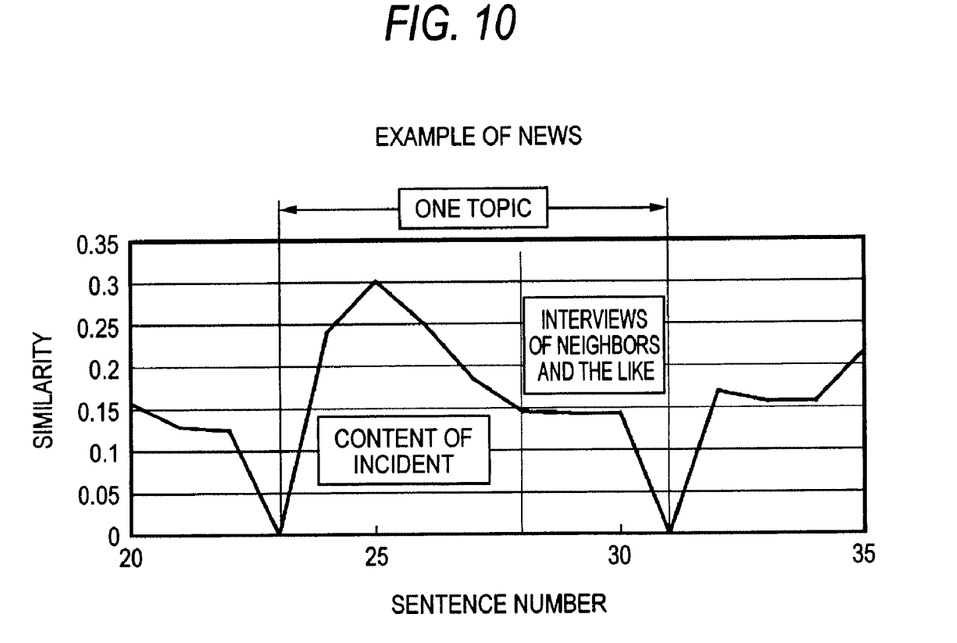
FIG. 10 is a graph showing an example of calculation results of similarities.

As shown in FIG. 10, in a news program or the like, generally, the concentration degree is high at an opening part when a summary of the news is reported (a part of "content of an incident" in FIG. 10), and the concentration degree is lower at a part that may include interviews or comments (a part of "interviews of neighbors and the like" in FIG. 10) continuously reported after the summary of the news.

FIG. 11 is a graph showing an example of similarities calculated when the detection of the changing points of the topics are performed with respect to a quiz program.

As shown in FIG. 11, the quiz program can be delimited according to a question (according to a topic) by the changing points of topics detected as described above. In the example of FIG. 11, the quiz program is delimited into respective sections Q1 to Q5 based on the similarities of the sections.

As can be seen from the transitions of the similarities, it may be considered that the question Q5, in which the higher concentration degree of the topic (similarity) is calculated, is the most representative question in the quiz program. It is preferable that when a digest play is performed, only the most representative parts are reproduced.

According to an embodiment of the invention, the concentration degree of the topic may also be a feature of the content, and a most representative part may be detected by combining features obtained based on video and audio. The feature obtained based on video is, for example, that the number of scene changes is large, and the feature obtained based on audio is, for example, that sound volume is high.

In the above embodiment, the case for which the text data from which the keywords are extracted is closed caption data as explained above. However, the keywords may be extracted from the text data obtained by recognizing character strings displayed on a screen by open captions, and the extracted text data may be used for calculation of similarities or detection of changing points in the same way as for the case of the closed caption data.

The above processing may be executed by hardware, as well as by software. When the series of processing is executed by software, the software is installed from a program recording media in a computer in which programs included in the software are incorporated in dedicated hardware, or for example, in a general-purpose computer which is capable of executing various functions by installing various programs.

The program recording media stores programs to be installed in the computer and includes, as shown in FIG. 4, the removable media 21, which is a package media such as the magnetic disc (including a flexible disc), the optical disc (including a CD-ROM (Compact Disc-Read Only Memory), a DVD (Digital Versatile Disc)), an electro-optical disc or a semiconductor memory, the ROM 12 in which programs are stored temporarily or permanently, and a hard disc forming the storage unit 18 and the like. The storage of the programs on the program recording media is performed by using wired or wireless communication media such as a local area network, Internet, or digital satellite broadcasting through the communication unit 19, which is an interface such as a router, and a modem.

In the specification, the steps of describing programs include not only the processing performed sequentially in time as described above but also include processing not performed sequentially in time but executed in parallel or individually.

According to an embodiment of the invention, the similarities of the keywords, which may be a criteria for positively detecting positions of changing points of topics in contents, may be calculated.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    an input unit configured to receive content in a form of an audio/video signal including closed captioning information;
    an extraction unit configured to extract sequentially in time keywords from multiple character strings included in the closed captioning information;
    a processor configured to calculate similarity values of the extracted keywords included in adjacent first regions of the multiple character strings, each first region including a predefined part of the multiple character strings;
    a detection window setting unit configured to set the adjacent first regions encompassing the extracted keywords, and to shift the adjacent first regions by a keyword one by one;
    a detection unit configured to detect a boundary point in the content of the audio/video signal based on the calculated similarity values, wherein the boundary point defines a separation between a portion of the audio/video signal defining a first topic of the content and another portion of the audio/video signal defining a second topic of the content;
    an attribute information generation unit configured to generate attribute information to be associated with the boundary point indicating a location of the boundary point within the content, and to add the attribute information indicating the location of the boundary point to the content,
    wherein the attribute information associated with the boundary point is one of time information, title information, and topic information;
    a memory device configured to store the content including the added attribute information; and
    a reproducing unit configured to reproduce the content including the added attribute information, wherein the reproducing unit is configured to search through the content to reproduce subparts of the content starting at a location of the boundary point identified by the attribute information, and the reproducing unit is configured to generate a window on a display in which an image of where the boundary point is located within the content is thumbnail-displayed.

2. The information processing apparatus according to claim 1, wherein
    the detection unit is further configured to detect the boundary point where a similarity value of the included keywords is lower than a threshold similarity value.

3. The information processing apparatus according to claim 1, wherein the detection unit is further configured to detect the boundary point in the audio/video signal by determining a minimum value of a cosine measure of the extracted keywords, wherein a location in the audio/video signal corresponding to the extracted keywords with a lowest value of the cosine measure is the boundary point.

4. The information processing apparatus according to claim 3, wherein the lowest value of the cosine measure indicating the boundary point is lower than a predefined threshold value.

5. The information processing apparatus according to claim 1, wherein the predefined part of the multiple character strings includes a predefined number of keywords.

6. The information processing apparatus according to claim 5, wherein the predefined number is 10.

7. The information processing apparatus according to claim 1, wherein the predefined part of the multiple character strings includes a predefined number of sentences.

8. The information processing apparatus according to claim 1, wherein the predefined part of the multiple character strings has a predefined time span.

9. The information processing apparatus according to claim 1, wherein the processor is configured to calculate the similarity values of the extracted keywords based on an Euclidian distance or a cosine measure in a vector space model.

10. The information processing apparatus according to claim 1, wherein the processor is configured to calculate the similarity values of the extracted keywords based on a predefined number of identical keywords identified in the adjacent first regions.

11. The information processing apparatus according to claim 1, wherein the processor is configured to determine adjacent second regions for calculating similarity values, each second region including at least one other keyword than a corresponding first region.

12. The information processing apparatus of claim 1, wherein the detection window setting unit is configured to set the adjacent first regions to encompass a predetermined number of the extracted keywords.

13. The information processing apparatus of claim 1, wherein the detection window setting unit is configured to set the adjacent first regions to encompass extracted keywords from the closed captioning information that is displayed for a predetermined time period.

14. The information processing apparatus of claim 1, further comprising:
a memory device configured to store an electronic programming guide that indicates a category of the content of the audio/video signal,
wherein the window detection setting unit is configured to set the adjacent first regions to encompass a number of the extracted keywords based on the category corresponding to the content in the electronic programming guide.

15. An information processing method, comprising:
receiving, with an input unit, content in a form of an audio/video signal including closed captioning information;
extracting, with an extraction unit, sequentially in time keywords from multiple character strings included in the closed captioning information;
calculating, with a processor, similarity values of keywords included in adjacent regions of the multiple character strings, each region including a predefined part of the multiple character string, the adjacent regions being set to encompass the extracted keywords, and shifting the adjacent regions by a keyword one by one;
detecting, with a detection unit, a boundary point in the content of the audio/video signal based on the calculated similarity values, wherein the boundary point defines a separation between a portion of the audio/video signal defining a first topic of the content and another portion of the audio/video signal defining a second topic of the content;
generating, with an attribute information generation unit, attribute information to be associated with the boundary point indicating a location of the boundary point within the content, and to add the attribute information indicating the location of the boundary point to the content,
wherein the attribute information associated with the boundary point is one of time information, title information, and topic information;
storing, in a memory device, the content including the added attribute information; and
reproducing, with a reproducing unit, the content including the added attribute information, wherein the reproducing unit is configured to search through the content to reproduce subparts of the content starting at a location of the boundary point identified by the attribute information, and the reproducing unit is configured to generate a window on a display in which an image of where the boundary point is located within the content is thumbnail-displayed.

16. A computer readable storage medium encoded with instructions, which when executed by a computer causes the computer to implement a method comprising:
receiving, with an input unit, content in a form of an audio/video signal including closed captioning information;
extracting, with an extraction unit, sequentially in time keywords from multiple character strings included in the closed captioning information;
calculating, with a processor, similarity values of keywords included in adjacent regions of the multiple character strings, each region including a predefined part of the multiple character string, the adjacent regions being set to encompass the extracted keywords, and shifting the adjacent regions by a keyword one by one;
detecting, with a detection unit, a boundary point in the content of the audio/video signal based on the calculated similarity values, wherein the boundary point defines a separation between a portion of the audio/video signal defining a first topic of the content and another portion of the audio/video signal defining a second topic of the content;
generating, with an attribute information generation unit, attribute information to be associated with the boundary point indicating a location of the boundary point within the content, and to add the attribute information indicating the location of the boundary point to the content,
wherein the attribute information associated with the boundary point is one of time information, title information, and topic information;
storing, in a memory device, the content including the added attribute information; and
reproducing, with a reproducing unit, the content including the added attribute information, wherein the reproducing unit is configured to search through the content to reproduce subparts of the content starting at a location of the boundary point identified by the attribute information, and the reproducing unit is configured to generate a window on a display in which an image of where the boundary point is located within the content is thumbnail-displayed.

17. An information processing apparatus, comprising:
receiving means for receiving content in a form of an audio/video signal including closed captioning information;
extraction means for extracting sequentially in time keywords from character strings included in the closed captioning information;
similarity calculation means for calculating similarity values of the extracted keywords included in adjacent regions of the multiple character strings, each region including a predefined part of the multiple character strings;
detection window setting means for setting the adjacent regions encompassing the extracted keywords, and to shift the adjacent regions by a keyword one by one detecting means for detecting a boundary point in the content of the audio/video signal based on the calculated similarity values, wherein the boundary point defines a separation between a portion of the audio/video signal defining a first topic of the content and another portion of the audio/video signal defining a second topic of the content;

generating means for generating attribute information to be associated with the boundary point indicating a location of the boundary point within the content, and to add the attribute information indicating the location of the boundary point to the content, wherein the attribute information associated with the boundary point is one of time information, title information, and topic information;

means for storing the content including the added attribute information; and means for reproducing the content including the added attribute information, wherein the means for reproducing searches through the content to reproduce subparts of the content starting at a location of the boundary point identified by the attribute information, and the means for reproducing generates a window on a display in which an image of where the boundary point is located within the content is thumbnail-displayed.

\* \* \* \* \*